May 28, 1935.　　H. W. ZIMMERMAN　　2,002,971
REAMER SHARPENER
Filed July 30, 1932　　5 Sheets-Sheet 1

May 28, 1935. H. W. ZIMMERMAN 2,002,971
REAMER SHARPENER
Filed July 30, 1932 5 Sheets-Sheet 2

Inventor:
Herman W. Zimmerman
By Rector, Hibben, Davis & Macauley
Attorneys.

May 28, 1935.   H. W. ZIMMERMAN   2,002,971
REAMER SHARPENER
Filed July 30, 1932   5 Sheets-Sheet 3

Inventor:
Herman W. Zimmerman,
By Rector, Hibben, Davis & Macauley
Attorneys.

May 28, 1935.   H. W. ZIMMERMAN   2,002,971
REAMER SHARPENER
Filed July 30, 1932   5 Sheets-Sheet 4

Inventor:
Herman W. Zimmerman
By Rector, Hibben, Davis & Macauley
Attorneys.

May 28, 1935.  H. W. ZIMMERMAN  2,002,971
REAMER SHARPENER
Filed July 30, 1932   5 Sheets-Sheet 5

Inventor:
Herman W. Zimmerman,
By Rector, Hibben, Davis & Macauley
Attorneys.

Patented May 28, 1935

2,002,971

UNITED STATES PATENT OFFICE 2,002,971

REAMER SHARPENER

Herman W. Zimmerman, Chicago, Ill., assignor to Automotive Maintenance Machinery Co., Chicago, Ill., a corporation of Illinois Application July 30, 1932, Serial No. 626,357

12 Claims. (Cl. 51—48)

My invention relates to tool sharpening mechanism and has to do particularly with a machine for sharpening reamers used in connection with automobile repair, machine shop and tool room work.

Even the smallest shops require several different size reamers as part of their equipment in order to properly handle their work. These reamers must be kept sharp in order to properly dress the surfaces treated, requiring the reamers to be sharpened from time to time. Reamer sharpeners which have been used heretofore and which are now on the market are quite complicated and are very expensive, so much so, in fact, that their use in the smaller shops is practically prohibited. The larger establishments, only, can afford these prior reamer sharpeners as part of their equipment and the smaller shop owner must, therefore, send his reamers to these larger shops for sharpening. This entails additional operating expense and occasions considerable delay when use of the particular reamer is required. Due to this inconvenience, there is a tendency for the shop owner who does not own one of these sharpening machines to neglect the sharpening of his own reamers. Wherefore his reamers are used at times in such a dull condition that the work done in many instances is of a highly unsatisfactory character.

It is an object of my invention to provide a highly efficient, compact and simple device for sharpening reamers and which may be manufactured and sold at an exceedingly low cost; whereby the small shop owners may well afford to purchase the same and thereby eliminate the inconvenience heretofore experienced, as above explained.

A further object is to provide a device of the foregoing character embodying a plurality of adjustments for predetermining the nature of the sharpening action, the character of these adjustments being such that they may be made and the sharpening carried out in such a fool-proof manner that a machine embodying my invention may be effectively operated by unskilled labor. This is quite an advantage over prior reamer sharpening devices which, due to their complicated nature, require considerable skill in setting the same for the proper sharpening action and for the manipulation of the same during the sharpening operation.

Additional objects are to provide a self-contained adjustable sharpening unit including a power-driven grinding wheel and self-contained means for truing-up this wheel to insure greater accuracy in the sharpening operation; to provide an improved gauging means which may be readily, quickly and accurately set for predetermining the position of the reamer blades with respect to the grinding wheel; to provide improved reamer supporting means adapted for the grinding of the reamer blades in a plane parallel with the reamer axis and/or in a plane at an angle to the reamer axis; and to provide a sharpening device of the foregoing character which is of light weight and which may be readily and easily transported from place to place.

Other objects and advantages will become apparent as this description progresses and by reference to the drawings wherein,—

Fig. 15 is an elevational view, partially in section, of another form of reamer support;

Referring to the drawings and particularly to Figs. 1 to 12, inclusive, the structure shown comprises a base 20 having a longitudinal T-slot 21 extending throughout its length. Reamer supports 23 and 24 of similar construction are adjustably mounted on the base 20. Specifically, each such support takes the form of a base 25 with a longitudinal rib 25ᵃ (Fig. 3) on its bottom adapted to extend into the T-stem portion of the base slot 21. A connector 26 of T-shape in cross section extends freely through the rib 25ᵃ and the base 25 for engagement with a knurled, accessible adjusting nut 27 which, upon being tightened, locks the support in any predetermined longitudinal position along the base. The support base 25 carries a bearing 28 in which there is received a cylindrical reamer-carrying member 29 having a longitudinal groove 29ᵃ in its upper surface for reception of the inner end of an adjusting screw 30 carried by the bearing 28 for locking the member 29 in any predetermined position with respect to its bearing support. The reamer-carrying members are provided with pointed ends 29ᵇ which engage the reamer 31 in a well known manner (Figs. 1 and 2) for rotatingly supporting the same in horizontal position with its axis parallel with the base 20 and with the axes of the supporting members 29. It will be obvious that, by adjusting either or both the reamer supports 25 or carrier members 29, various kinds and sizes of reamers may be properly supported.

As is well known, the reamer blades may extend in straight line fashion parallel with the reamer axis or in spiral fashion longitudinally of the tool. In either event, according to my invention, the reamer blades are sharpened by a rotatable grinding wheel 32 (Fig. 3) which is supported for movement back and forth longitudinally along the reamer blades while it is in rotation. Specifically, the grinding wheel support takes the form of lateral base extension 33 having upstanding end portions 33ᵃ bridged by a pair of spaced, horizontal and parallel rods 34, 35 upon which a carriage structure 36 is mounted for longitudinal slide movement. This carriage takes the form of a pair of tubular base members 37 bridged by a web 37ᵃ and slidably engaging the rods 34, 35. A channel-shaped slide member 38 extends upwardly from the members 37 and it is provided, between its channel sides 38ᵃ, with a rib 38ᵇ having a finished slide surface slotted as at 39. This slide member 38 is also provided on its side opposite the boss 38ᵇ with a slide rib 40 through which the slot 39 extends for a purpose which will now be described.

The grinding wheel 32 is carried by a shaft 41 driven by an electric motor 42 which is secured by a plurality of screws 43 to an arm 44. This arm is provided with a lateral slide extension 45 having a slide groove 45ᵃ for reception of the vertical slide rib 40 on the member 38. This rib-and-groove construction holds the arm in a predetermined centered position with respect to the support 38 and with the arm extending outwardly over and above the reamer 31 at, preferably, right angles to the axis of the latter and its supports.

Figure 1:
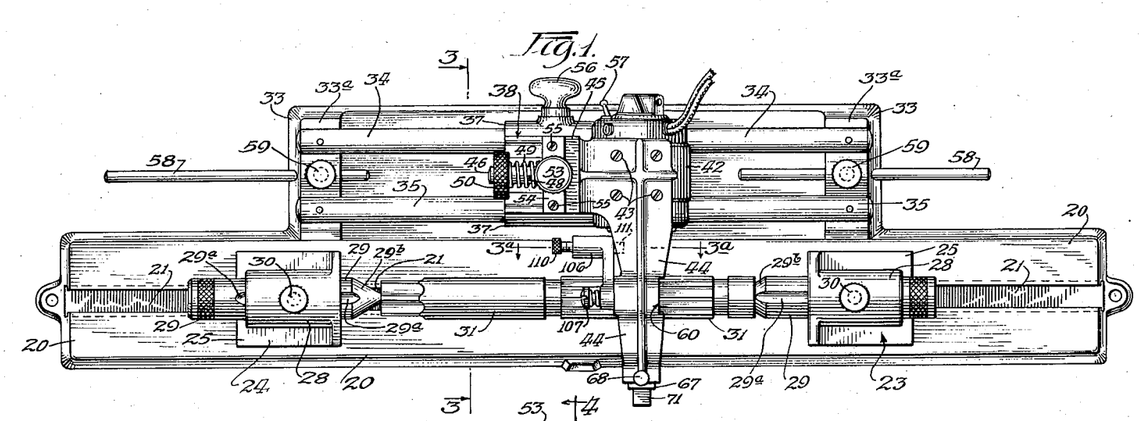
Figure 1 is a top plan view of one form of sharpening device embodying my invention.
Figure 2:
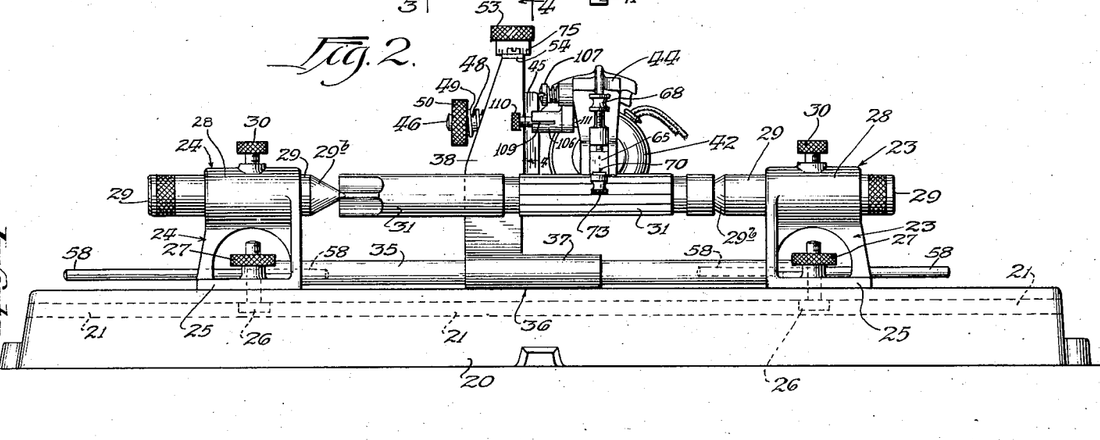
Fig. 2 is a front elevational view of the device shown in Fig. 1.

Vertical adjustment and securement of the arm 44 (Figs. 3–6) in adjusted position is accomplished by a stud 46 having a reduced threaded end 46ᵃ engaged with the arm slide extension 45 and having an enlarged section 46ᵇ projected through the slot 39 in the upright support 38. The end of this stud extending beyond the slot 39 receives a washer 47 which seats against the adjacent slide surface 38ᵇ and a tubular sleeve 48 surrounded by a slightly longer spring 49. The outer end of this stud is threaded for the reception of a knurled adjusting nut 50 which, when tightened, acts on the parts just described to draw the arm slide member 45 firmly against and hold it in position on the vertical support 38. The spring 49 being slightly longer than the sleeve 48 provides an initial tensioned slide engagement between the washer 47 and slide surface 38ᵇ so as to tension the vertical adjustment movement of the carriage structure. The stud section 46ᵇ is provided with a vertical threaded opening 51 which receives the threaded stem 52 of an adjustment nut 53. The stem 52 passes freely through the upper part of the upright member 38 and also a plate member 54 which is confined against longitudinal displacement by its location between a stem shoulder 52ᵃ and the nut 53. The plate 54 is secured to the top of the upright member 38 by a pair of screws 55 so that, by rotating the nut 53 in clockwise direction, with the lock nut 50 loosened slightly, the arm 44, motor 42, and grinding wheel 32 are moved downwardly as a unit toward the reamer. Obviously, movement of the nut 53 in the opposite direction raises the structure just mentioned. In this manner, the grinding wheel may be set in any predetermined vertical position for grinding contact with the reamer blade and, upon tightening of the lock nut 50, it will be held in this predetermined position during the sharpening operation. This adjustment may be made from time to time as the sharpening operation continues. It will also be understood that the slidable connection between the upright support 38 and the rods 34, 35 permit the entire frame unit carried thereby to be moved backwardly and forwardly along the reamer axis as the sharpening operation is carried on. This movement is facilitated by a knob 56 which is carried by the outermost of the slide supports 37 (Fig. 1). It will be further understood that the motor 42 may be connected to any suitable source of power and may be cut in and out by means of a suitable switch device 57 (Fig. 1).

For best operation, the range of back-and-forth movement of the grinding wheel should be limited to the length of the reamer blades. To this end, each of the base extension ends 33ᵃ supports an adjustable and horizontally-disposed rod 58 adapted to be locked in position by a set screw 59, the inner ends of which rods are adapted to engage the ends of the web 37ᵃ joining the tubular support members 37. With this arrangement, the grinding wheel may be moved to one end of the reamer blade and the corresponding rod 58 set to limit the movement of the grinding wheel carriage to that extent in that direction, and a similar stop adjustment may be made in the same manner at the other end of the reamer blades.

It is well known that the cutting edges of reamers for reaming different materials may vary; for example, steel may be reamed in certain instances while cast iron or bronze may be reamed in others. It is further recognized that where cast iron or bronze, or materials of similar character, are to be reamed less support is required for the reamer cutting edge, and where steel or similar tougher materials are to be reamed more support for the cutting edge is required. The supporting surface is generally referred to as the "land" and the required cutting edge support is accomplished in the sharpening of the reamer cutting edge by grinding the "land" at a predetermined angle with respect to the center line of the reamer which passes through the cutting edge to be sharpened. That is to say, it is customary in reamers adapted for cast iron or bronze to grind the "land" on a lesser angle with respect to the reamer center line than the angle employed for steel, which difference in angular relationship provides the desired difference in "land" or cutting edge supporting surface. My invention contemplates a simple arrangement by which the tool may be readily and quickly set for the grinding of the "land" or cutting edge supporting surface at the desired angle with respect to the reamer center line above mentioned.

Figure 11:
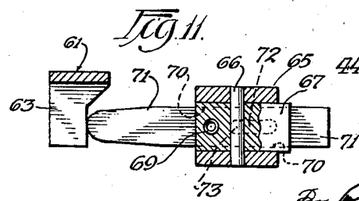
Fig. 11 is a section taken substantially on line 11—11 of Fig. 7.
Figure 12:
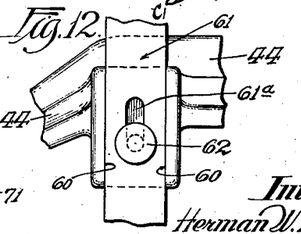
Fig. 12 is a fragmental elevational view of the opposite side of the gauging structure shown in Figs. 7 and 8.

Specifically, that portion of the arm 44 extending out over the reamer and directly above the grinding wheel 32 is provided with a vertical slideway 60 (Figs. 1 and 12) extending, preferably, at right angles to the arm 44 and the axis of the grinding wheel and the reamer. This slideway is adapted to support a gauge plate 61 mounted for vertical adjustment movement therein by a slot-and-screw arrangement 61ᵃ, 62 (Fig. 12). The opposite ends of the gauge plate 61 are provided at opposite sides with similarly-extended right-angled tongues 63, 64 of less width than the plate. These tongues are, in turn, of different width, the one (63), for example, being adapted for the setting and gauging of the tool for the dressing of reamers adapted for cast iron, bronze, or the like, while the other (64), for example, being adapted for the dressing of reamers adapted for steel, or the like. The outer end of the supporting arm 44 is turned downwardly and terminates in a bifurcate head portion 65 (Figs. 3 and 7) which pivotally supports, as at 66, a block 67. The head 65 also supports an adjusting screw 68, the inner end of which engages the outward end of the block 67 to swing it downwardly about its pivot in opposition to a spring 69 confined between the other end of the block and the head 65. The bottom of the block 67 is provided with a groove 70 in which is received a flat gauge strip 71 (Figs. 3, 7, 8 and 11) formed, preferably, of spring metal and slotted as at 72. An adjusting screw 73 passes through the gauge strip slot 72 and engages a threaded opening in the block for securing the strip 71 in predetermined longitudinally adjusted position within its supporting groove.

Figure 8:
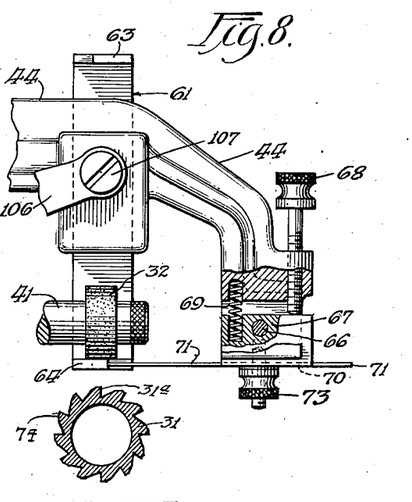
Fig. 8 is a view similar to Fig. 7 and showing the gauge members in position for the sharpening of another form of reamer constructed, for example, for the reaming of steel material.

In setting the tool for the sharpening of, for example, a reamer adapted for steel (see Fig. 8), the gauge plate 61 is applied to the arm 44 with its tongue 64 at its lower end. The plate 61 is then shifted vertically into contact with the lower surface of the grinding wheel 32 and is firmly locked by its slot-and-screw structure 61ᵃ, 62. The adjusting screw 68 is then rotated in the proper direction to bring the inward end of the gauge strip 71 into alignment with the tongue 64, whereupon the set screw 73 is loosened and the plate 71 shifted toward and into engagement with the adjacent edge of the tongue 64 as best illustrated in Figs. 8 and 11. The set screw 73 is then tightened to firmly hold the strip 71 in this position. In setting the tool in the foregoing manner, the inward end of the gauge strip 71 will be set so that it is spaced slightly from the bottom of the grinding wheel for obvious reasons.

After the foregoing adjustments have been made, the gauge plate 61 may be loosened and turned out of the way, or it may be entirely removed so as to leave the bottom portion of the grinding wheel (previously obstructed by the tongue 64) free for engagement with the reamer blade to be sharpened. The grinding wheel frame unit is then lowered by actuation of the adjusting nut 53 until the grinding wheel is in proper grinding contact with the reamer blade, at which time the inner end 71ᵃ of the gauge strip 71 is so located with respect to the grinding wheel that, upon rotation of the reamer toward the strip 71 the inner end of the strip will strike the vertical reamer blade surface 31ᵃ (Figs. 7–10) located forwardly of the cutting edge. In the following grinding operation, the reamer is held by the operator in any desirable manner so that the inner end 71ᵃ of the gauge strip remains in contact with and rides along the vertical reamer surface 31ᵃ thereby maintaining a predetermined position of the grinding wheel at all times with respect to the reamer blade cutting edge. By referring to Fig. 10, for purposes of illustration, it will be seen that when the reamer is rotated so that its vertical edge surface 31ᵃ engages the inner end 71ᵃ of the strip 71 the reamer center line passing through the cutting edge to be sharpened, which may be illustrated by the line C—L, has been rotated past the center or circumferential median line of the grinding wheel so that the angle between the grinding surface of the wheel and the center line C—L of the reamer is less than a right angle. In the sharpening operation, the "land" 74, or cutting edge supporting surface, will be ground at this angle and a predetermined cutting edge support (suitable for steel, for example) is formed.

Figure 7:
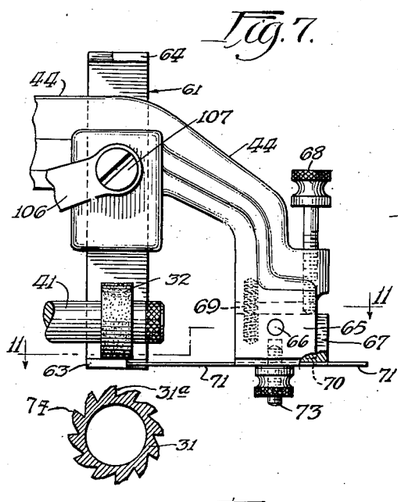
Fig. 7 is a fragmental elevational view of the gauge-support and related structure showing the gauge members in position for setting the device for the sharpening of one form of reamer constructed, for example, for the reaming of cast iron or bronze material.
Figure 9:
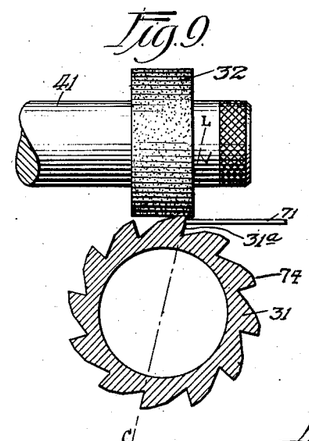
Fig. 9 is an enlarged fragmental view, partially in section, illustrating the relationship of the grinding wheel to the reamer blades when the device is set in the position shown in Fig. 7.
Figure 10:
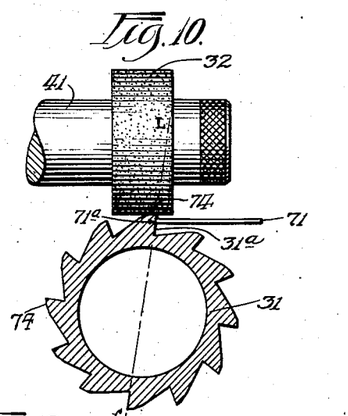
Fig. 10 is a view similar to Fig. 9 except showing the relative positions of the grinding wheel and the reamer blades when the device is set in the position of Fig. 8.

Now referring to Figs. 7 and 9, which illustrate by way of example only, an arrangement for sharpening of reamers adapted for cast iron, bronze, or the like, the gauge plate 61 is reversed so that the longitudinal position of the gauge strip 71 is determined by the wider tongue 63 which permits of clockwise rotation of the reamer 31 to a greater extent (Fig. 9) to move its center line C—L farther beyond the center or circumferential median line of the grinding wheel; wherefore the angle between the grinding surface of the grinding wheel and the center line of the reamer will be less as compared to the angle illustrated in Fig. 10. Consequently, when the reamer blade with the setting of Fig. 9 is completely ground, it will have, due to the lesser angle, less supporting surface than in the setting of Fig. 10.

The operation of my invention will be obvious from the foregoing. The necessary adjustments may be made readily, quickly and accurately by even an unskilled operator. The operator first determines the character of the reamer upon which he is to work. He then sets the gauging structure for that particular type of reamer, and adjusts the grinding wheel in the grinding position with respect to the reamer. As the motor 42 is cut in to drive the grinding wheel 32, the operator grasps the carriage knob 56 and moves the carriage structure back and forth axially along the reamer. The gauge strip 71 is always maintained in engagement with the straight forward wall 31ª of the cutting edge being ground so that the blade is uniformly ground and sharpened throughout its length. In case a spiral-bladed reamer is being dressed, the strip 71 is similarly maintained in contact with the blade, the reamer being properly rotated as the carriage is being shifted back and forth to accommodate the spiral blade.

The extent of grinding of each blade can be determined with a fair degree of accuracy so that the several blades of the reamer may be ground with approximate uniformity. To this end, the adjusting nut 53 which shifts the grinding wheel carriage vertically is provided with a plurality of graduations 75 (Figs. 3 and 4) each of which represents, for example, .001 inch. The plate 54 is provided with a guide mark 76 with which the graduated marks 75 may register. When the grinding wheel is initially set in grinding contact with the reamer blade, the operator may observe the particular position of the graduations 75 with respect to the mark 76. As the sharpening operation continues and the nut 53 is actuated to lower the grinding wheel, the approximate extent of grinding will be indicated by the relative movement which takes place between the initially aligned graduation 75 and the mark 76.

Figure 13:
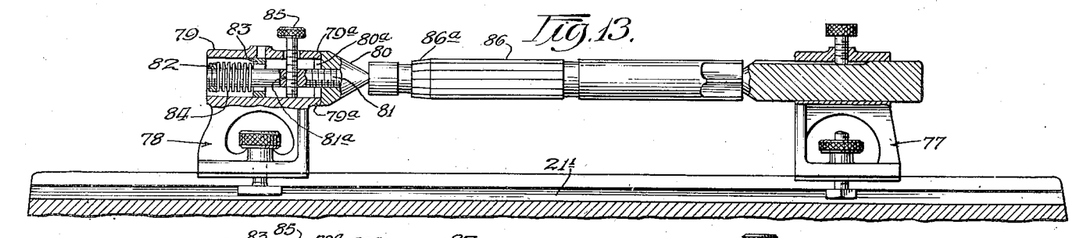
Fig. 13 is an elevational view, partly in section, of a modified form of reamer support and by which the reamer may be supported at an angle to grind the blades on a taper at one end thereof, the parts being shown in position for sharpening of the blade surfaces which are parallel with the reamer axis.
Figure 14:
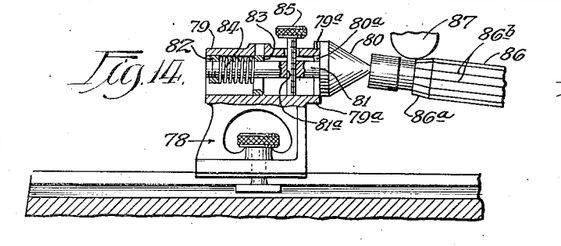
Fig. 14 is a partial sectional view similar to Fig. 13 except showing the reamer support parts in position for the grinding of the taper at one end.

For reasons well known, certain forms of reamers have the leading ends of their blades ground on a taper and the remainder of the blades are ground parallel with the axes of the reamers. In Figs. 13 and 14, I show a modified form of reamer support for properly positioning the reamer for both the sharpening of its tapered end and the remainder of the cutting edge surface. Specifically, I employ a support 77 similar to the supports 23 and 24 of the form of Figs. 1 and 2, and a vertically adjustable support 78. This latter support is slidably connected with the base groove 21' in the same manner as the forms of supports previously described and is provided with a horizontally-disposed tubular part 79. This tubular part 79 supports a reamer carrier which takes the form of a tapered head 80 having a reduced stem 81 extending through the support 79 and receiving a retaining nut 82 on its rear end. The part 79 has upper and lower projecting tongues 79ª which engage in a vertical groove 80ª in the rear face of the head 80 so as to permit of vertical slide movement of the head 80 without rotation thereof. An abutment member 83 is secured within and near the central portion of the part 79 and a spring 84 is confined between this abutment and the nut 82. This spring tends to hold the head 80 pressed rearwardly in a central position. The head supporting stem 81 is provided with a threaded opening 81ª which receives the threaded stem of an adjusting nut 85 which passes downwardly through an aligned opening in the part 79 and through the stem 81 into engagement with the lower, inner wall surface of the part 79. Obviously, with this arrangement, by turning the adjusting nut 85 clockwise, its stem is screwed through the stem 81 and the head 80 is raised or tipped upwardly to the desired angle (see Fig. 14). When the adjusting nut 85 is rotated in the opposite direction, the spring 84 tends to cause the stem 81 and head 80 to assume their normal horizontal position as determined by the extent to which the screw 85 is rotated.
Means of any desired form (not shown) may be employed for limiting the lowering of the head 80 to a truly horizontal position. As clearly illustrated in Fig. 14 when the head 80 is raised, the tapered end 86ª of the reamer 86 is raised so that the cutting edges at that end lie in a plane substantially parallel with the normal axis of the reamer supports. With the tool in this position (Fig. 14), the grinding wheel 87 sharpens the cutting edges in the manner heretofore described in connection with the previous form and, when such edges are sharpened, the support may be lowered so that the other reamer cutting edges 86ᵇ are brought into a plane substantially parallel with the normal axis of the tool. This same purpose may be accomplished by using a pair of supports 88 (Fig. 15) which are similar to the supports 77 (Fig. 13), 23 and 24 (Figs. 1 and 2); and in that case I employ a plurality of shims 89 of proper thickness for elevating the reamer carrier 90 to the proper position to properly tilt the leading end 91ª of the reamer 91 for the proper grinding operation as mentioned in connection with the form of Figs. 13 and 14.

Figure 16:
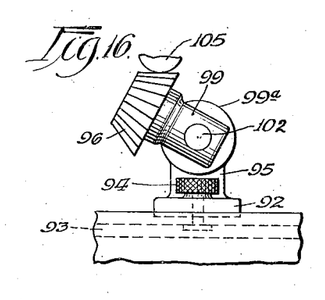
Fig. 16 is a fragmental elevational view of still another form of supporting means by which cutting blades disposed normally at an angle with respect to the axis of their support may be held for sharpening by the device shown in Figs. 1 to 3, inclusive.
Figure 17:
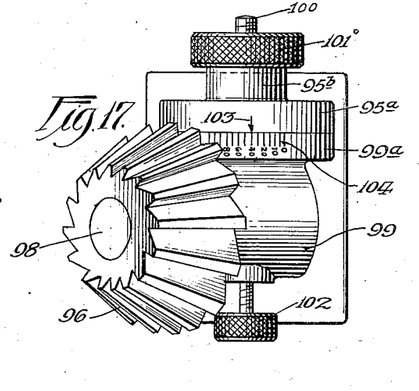
Fig. 17 is an enlarged top plan view of the structure shown in Fig. 16.
Figure 18:
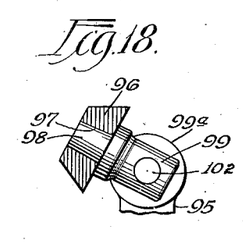
Fig. 18 is a longitudinal sectional view through the structure shown in Fig. 16.

In the grinding of tapered valve seats, it is customary to employ a reamer device having its cutting blades disposed at an angle with respect to its axis. In Figs. 16 to 18, inclusive, I have shown such a structure and a modified form of support for carrying the same while the cutting blades are being dressed. Specifically, this supporting structure takes the form of a base 92 secured in the base slot 93 by a nut and connector device 94 similar to that employed in the previously-described forms. This base supports an upright member 95 having a disk like top portion 95ª with a laterally extending hub 95ᵇ. The reamer 96 to be dressed is provided, as is customary, with a tapered bore 97, and the support structure, according to my invention, includes a complementally tapered shaft 98 upon which a reamer 96 is friction-fitted. This shaft is carried by a bearing member 99 which, in turn, has a disk like portion 99ª adapted to fit snugly and rotatably against the upright disk supporting part 95ª.
The disk part 99ª has a laterally projecting shaft 100 which rotatably fits in an opening extending through the disk part 95ª and its hub 95ᵇ, the outer end of its shaft being reduced and threaded to receive a knurled lock nut 101. The reamer supporting shaft 98 is axially adjustable within its support 99 and it is held in predetermined adjusted position therein by a set screw 102. The supporting disk part 95ª is provided on its upper surface with an indicator mark 103 and the rotatable disk part 99ª is provided with graduations 104 which indicate (when aligned with the mark 103) the degree of the angle which the shaft 98 assumes with respect to the horizontal when its support is rotated about the disk part 95ª. For example, when the disk 99ª is rotated so that its 45° mark registers with the mark 103, the supporting shaft is then disposed at an angle of 45° with respect to the horizontal and with respect to the normal axis of the tool. Wherefore, if the reamer blades are pitched at an angle of say 45° with respect to their supporting shaft (or the shaft 98) it is only necessary to rotate the support part 99 until the graduations or scale 104 registers 45° with the mark 103, thereby bringing the reamer blades into a horizontal plane parallel with the normal axis of the tool support; wherefore the grinding wheel 105 may be properly contacted with the cutting edges of such blades to sharpen the same in the manner described in connection with previous forms.

Figure 3:
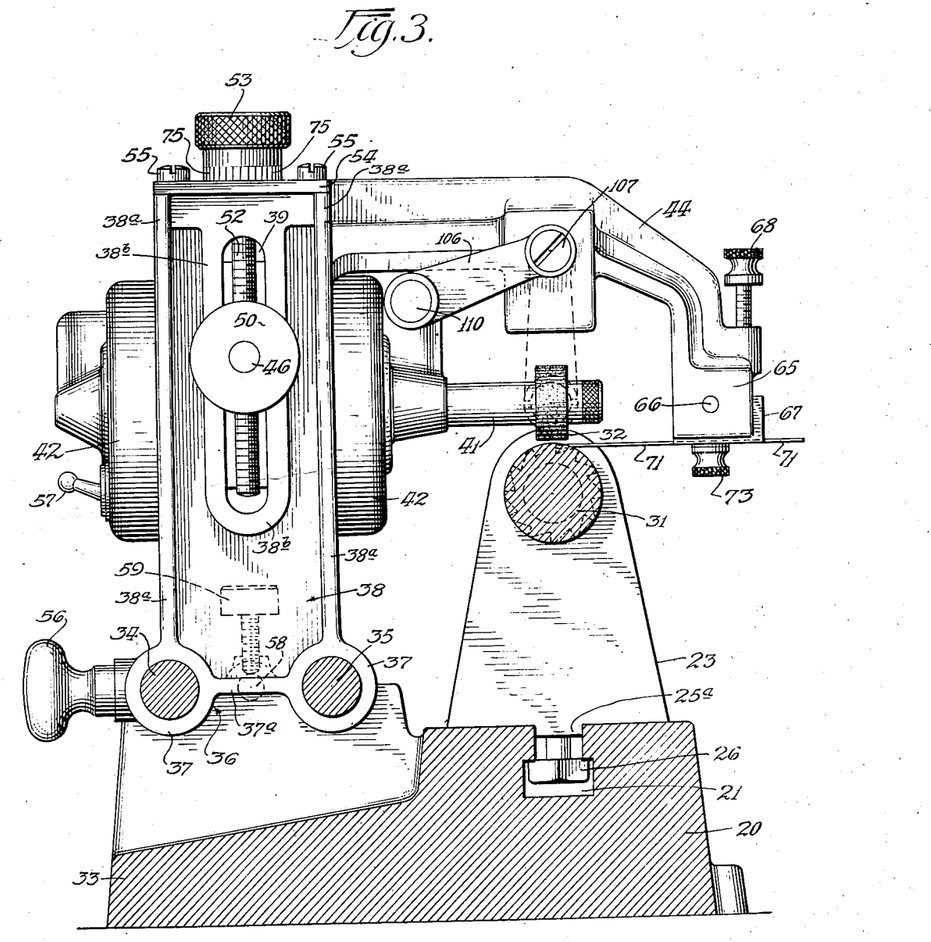
Fig. 3 is an enlarged transverse sectional view taken substantially on line 3—3 of Fig. 1.
Figure 3A:
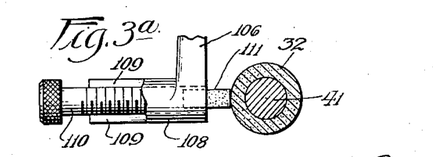
Fig. 3a is an enlarged fragmental view, partially in section, taken at the position indicated by the line 3ª—3ª in Fig. 1.
Figure 4:
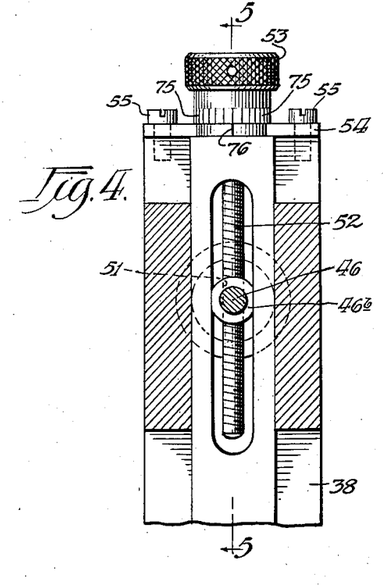
Fig. 4 is a section taken substantially on line 4—4 of Fig. 2.
Figure 5:
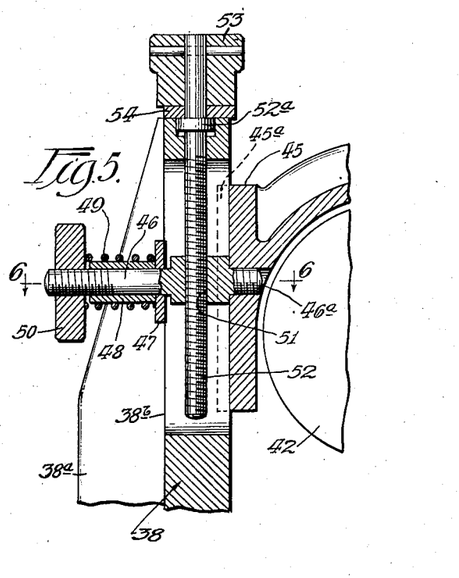
Fig. 5 is a section taken substantially on line 5—5 of Fig. 4.
Figure 6:
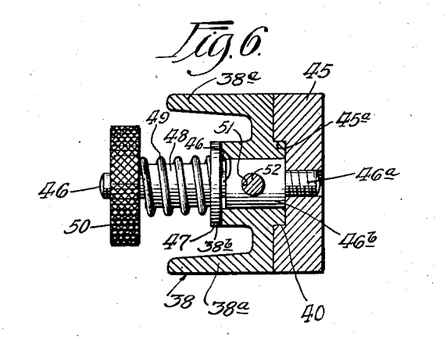
Fig. 6 is a section taken substantially on line 6—6 of Fig. 5.

It is quite essential for true grinding and sharpening operation that the grinding wheel be maintained as nearly as possible, throughout its width, at right angles to its center line so that a true and uniform grinding surface will always engage the reamer surface to be sharpened. To encourage the operator to maintain this wheel in proper condition and to make certain that any dressing down at the grinding wheel will be properly carried out with respect to the various operating centers of the tool, I provide means self-contained within the wheel supporting-carriage for this truing-up operation. Specifically, an arm 106 (Figs. 1, 2, 3 and 3a) is pivotally mounted as at 107 on the carriage arm 44 immediately above and, preferably, on center with the center of the grinding wheel 32. The arm 106 is of sufficient length to project its free end down into alignment with the grinding wheel 32 as indicated in dotted lines in Fig. 3. Referring particularly to Fig. 3a, the free end of this arm is provided with an integral, internal threaded sleeve 108 split as at 109, so as to afford a self-gripping hold on an adjustable screw stem 110 mounted therein. This stem is adapted to support a piece of wheel dressing material 111 (such, for example, as carborundum, diamond, etc.) which by rotating the stem 110 may be adjusted inwardly and outwardly so as to project it toward and from the grinding wheel 32. With this arrangement, to dress the wheel 32, the motor 62 is operated to rotate the wheel and the arm 106 is swung back and forth so that the material 111 engages the wheel surface. As this operation is carried out, the material 111, obviously, will dress down the wheel to a grinding surface which is at right angles to the plane of the grinding wheel. When the dressing operation has been completed, the arm may be swung upwardly to the full line position shown in Fig. 3 so that it does not interfere with the grinding operation. The pivotal connection between the arms 106 and 44 is such that the arm will be held in its inoperative position, but may be readily swung back and forth as described.

It is to be understood that while I have shown various forms and adaptations of my invention, other changes in details and arrangement of parts may be made without departing from the spirit and scope of my invention as defined by the claims which follow.

I claim:

1. In combination in a tool of the class described, means for rotatably supporting the reamer in substantially horizontal position, a grinding carriage mounted for movement along the axis of the reamer, means for limiting movement of said carriage, a grinding wheel supported by said carriage, means for predetermining the position of each reamer blade with respect to the grinding surface of said wheel, and means for gauging predetermined positions of said reamer blade positioning means.

2. In combination in a tool of the class described, means for rotatably supporting the reamer in substantially horizontal position, a grinding carriage mounted for movement along the axis of the reamer, adjustable means on said base for limiting movement of said carriage to an extent equal to the length of the reamer blades, a grinding wheel supported by said carriage, means for adjusting said wheel vertically toward and from the reamer, adjustable means for predetermining the position of each reamer blade with respect to the grinding surface of said wheel, and means for gauging predetermined positions of said reamer blade positioning means.

3. In a tool of the class described, the combination of a base, reamer supports mounted thereon, a carriage unit slidably mounted on said base, said carriage comprising an upright member, a horizontal member slidably carried by said upright member, means for adjusting said horizontal member vertically, a rotatable grinding wheel and drive means therefor carried by said horizontal member, an adjustable reamer stop member carried by said horizontal member for positioning the reamer blades to be sharpened relative to the grinding surface of said wheel, and means independent of the reamer for initially predetermining the adjusted position of said stop member.

4. In combination in a tool of the class described, means for supporting the reamer in substantially horizontal position, a grinding wheel, means for raising and lowering said grinding wheel, means for rotating said grinding wheel, means for moving said grinding wheel along the axis of the reamer, adjustable means for predetermining the position of the reamer cutting edge surface laterally with respect to the center of the grinding wheel grinding surface, and means for predetermining the extent of adjustment of said adjustable means.

5. In a structure of the class described, means for rotatably supporting the reamer, and carriage structure movable axially of the reamer and comprising an arm projected transversely of and above the reamer, a grinding wheel supported by said arm, a vertically adjustable gauge member adapted to be supported by said arm and having a part adapted to be projected beneath said wheel, and another and horizontally adjustable gauge member supported by said arm and adapted to be moved to engage one end of the same with said first gauge member part, and means for adjusting said one end of said second-named gauge member so that it will engage the forward part of the reamer cutting edge to be sharpened to predetermine the position of the reamer with respect to said grinding wheel.

6. In structure of the class described, means for supporting the reamer, and grinding means movable relative to the reamer which comprises a supporting member movable axially of the reamer, a grinding wheel and drive means therefor carried by said supporting member, a horizontal gauge member swingably carried at one end by said supporting member and adapted to be adjusted laterally toward and from said grinding wheel, manually-operated means for moving said gauging member to effect swinging movement of the other end of said gauging member vertically toward and from said grinding wheel, and means for limiting to variable extents the extent of adjustment of said gauging member laterally toward said grinding wheel, said gauging member being adapted in operation to engage the reamer forwardly of the reamer cutting edge being sharpened to predetermine the angle on which the cutting edge is ground.

7. In a tool of the class described, a grinding wheel carriage unit which comprises a vertical support mounted for movement along the axis of the reamer, an arm mounted on said support for vertical movement, a motor having a shaft carried by said arm, a grinding wheel on said shaft, a horizontally disposed gauge strip carried by said arm with one end projected toward the lower part of said wheel, means for moving said one end of said strip vertically relative to said wheel, means for moving said one end of said strip laterally relative to said wheel, and detachable means having stop elements which limit the lateral adjustment of said strip to predetermined positions, said one end of said strip being adapted to engage the reamer forwardly of its edge to be ground so as to determine the angle on which the cutting edge is ground.

8. In structure of the class described, means for rotatably supporting the reamer in substantially horizontal position, a grinding carriage movable along the axis of the reamer, a grinding wheel carried by said carriage, and means for raising and lowering said wheel, said means comprising a vertically slotted member, a wheel support mounted thereon for vertical slide movement only, a vertical screw member rotatably carried by said vertical member and held against vertical displacement, and extending into the slot of said vertical member, a member on said wheel support extending horizontally through said slot where it is threadedly engaged by said screw member, and adjustable means on said latter member and engageable with said vertically slotted member for holding said wheel support in predetermined adjusted position.

9. In structure of the character described, a grinding carriage movable back and forth along the axis of the reamer which comprises a standard, a member mounted on said standard for slide movement and having a horizontal part and a vertical part, a grinding wheel supported by said member beneath its horizontal part, a lateral gauge member pivotally supported by said vertical part of said member and being adjustable laterally toward and from said wheel, and another and detachable gauge member adapted to be mounted on said horizontal part of said member and having an end part adapted to extend under said wheel, said latter gauge member limiting the extent of adjustment of said first gauge member laterally toward said wheel to predetermine the position of the reamer cutting edge to be ground with respect to the grinding surface of said wheel.

10. In a tool of the class described, a reamer rotatably mounted so as to move successive cutting edges thereof into position to be ground, a grinding wheel mounted adjacent the reamer with its grinding surface at right angles to the axis of the reamer and with its circumferential median line in alignment with the center of the reamer, adjustable means engageable with the reamer forwardly of its cutting edge to limit rotation of the reamer in one direction and to position the cutting edge to be sharpened with the center line of the tool passing therethrough to one side of the circumferential median line of said wheel, and means for limiting the adjustment of said adjustable means in one direction.

11. A self-contained grinding carriage structure for a tool of the class described which comprises an upright member, a second member slidably supported by said upright member for vertical movement, means for adjusting said second member vertically, a grinding wheel and its drive means carried by said second member, a laterally and tiltably adjustable stop member carried by said second member for engagement with the reamer to predetermine the position of its blades with respect to said wheel, and a gauge member adapted to be supported by said second member and having a gauging element adapted to be engaged by said stop member to predetermine the setting of the latter.

12. A reamer support for a tool of the class described which comprises a base part having provision for adjustable slide mounting, an upright member carried by said base, a horizontal bearing member carried by said upright member, a reamer carrier mounted in said bearing member and having a cone-shaped head engageable with one end of the reamer, means for adjusting said carrier vertically in said bearing member, and means associated with said bearing member for tensioning the adjusting movement of said carrier.

HERMAN W. ZIMMERMAN.